US009151197B2

(12) United States Patent
Sittig et al.

(10) Patent No.: US 9,151,197 B2
(45) Date of Patent: Oct. 6, 2015

(54) PARTICLE SEPARATOR WITH A METAL LAYER THROUGH WHICH EXHAUST GAS CAN FLOW AND MOTOR VEHICLE HAVING AT LEAST ONE PARTICLE SEPARATOR

(71) Applicant: EMITEC GESELLSCHAFT FUER EMISSIONSTECHNOLOGIE MBH, Lohmar (DE)

(72) Inventors: Joachim Sittig, Siegburg (DE); Michael Voit, Leverkusen (DE); Ferdi Kurth, Mechernich (DE); Ludwig Wieres, Overath (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 5 days.

(21) Appl. No.: 13/897,588

(22) Filed: May 20, 2013

(65) Prior Publication Data
US 2013/0247547 A1  Sep. 26, 2013

Related U.S. Application Data (63) Continuation of application No. PCT/EP2011/070223, filed on Nov. 16, 2011.

(30) Foreign Application Priority Data

Nov. 19, 2010 (DE) .......................... 10 2010 051 730

(51) Int. Cl.
*F01N 3/02* (2006.01)
*F01N 3/021* (2006.01)
(Continued)

(52) U.S. Cl.
CPC ............... *F01N 3/021* (2013.01); *B01D 39/12* (2013.01); *B01D 39/2027* (2013.01); *B01D 46/10* (2013.01); *B01D 46/103* (2013.01); *B01D 46/521* (2013.01); *B01D 2279/30* (2013.01)

(58) Field of Classification Search
CPC ............... B01D 2279/30; B01D 39/12; B01D 39/2027; B01D 46/10; B01D 46/103; B01D 46/521; F01N 3/021
USPC ...................................... 60/272–324
See application file for complete search history.

(56) References Cited

U.S. PATENT DOCUMENTS 3,144,315 A * 8/1964 Hunn .............................. 96/421
4,169,059 A    9/1979 Storms
(Continued)

FOREIGN PATENT DOCUMENTS

CN    1404411 A    3/2003
EP    0764455 A2   3/1997
(Continued)

OTHER PUBLICATIONS

Translation FR2920821, Raffier Ludovic, Mar. 13, 2009.*
(Continued)

*Primary Examiner* — Jesse Bogue
(74) *Attorney, Agent, or Firm* — Laurence A. Greenberg; Werner H. Stemer; Ralph E. Locher (57) ABSTRACT

A particle separator for treating the exhaust gases of an internal combustion engine includes a housing having an inlet opening, an outlet opening, a cross section and a central axis. At least one metallic layer, through which exhaust gas can flow, is located in the housing and has an undulation or corrugation that spans the cross section of the housing. The particle separator has a large surface for providing the lowest possible flow resistance and a low risk of clogging. A motor vehicle having at least one particle separator is also provided.

25 Claims, 4 Drawing Sheets (51) Int. Cl.
*B01D 39/12* (2006.01)
*B01D 39/20* (2006.01)
*B01D 46/10* (2006.01)
*B01D 46/52* (2006.01)

(56) References Cited

U.S. PATENT DOCUMENTS

| | | | |
|---|---|---|---|
| 5,800,790 | A | 9/1998 | Imamura et al. |
| 6,991,668 | B2 * | 1/2006 | Towsley ............... 55/525 |
| 7,470,407 | B2 * | 12/2008 | Toyoda ............... 422/177 |
| 8,082,729 | B2 | 12/2011 | Rolle et al. |
| 8,123,840 | B2 * | 2/2012 | Marra ............... 96/16 |
| 2003/0038088 | A1 | 2/2003 | Denys et al. |
| 2004/0139858 | A1 * | 7/2004 | Entezarian et al. ....... 95/275 |
| 2006/0000196 | A1 * | 1/2006 | Beier et al. ............ 55/497 |
| 2007/0220856 | A1 * | 9/2007 | Cho et al. ............. 55/525 |
| 2007/0256399 | A1 * | 11/2007 | Yang .................. 55/418 |
| 2008/0041051 | A1 * | 2/2008 | Silbermann et al. ..... 60/605.2 |
| 2010/0180577 | A1 * | 7/2010 | Gonze et al. .......... 60/277 |
| 2012/0006006 | A1 * | 1/2012 | Hertzberg et al. ...... 60/274 |
| 2012/0090300 | A1 * | 4/2012 | Champoux et al. ...... 60/274 |

FOREIGN PATENT DOCUMENTS

| | | |
|---|---|---|
| FR | 2920821 A1 | 3/2009 |
| JP | 2002221020 A | 8/2002 |
| JP | 2010151091 A | 7/2010 |
| WO | 2007110170 A1 | 10/2007 |

OTHER PUBLICATIONS

International Search Report of PCT/EP2011/070223, dated Jan. 30, 2012.

* cited by examiner

PARTICLE SEPARATOR WITH A METAL LAYER THROUGH WHICH EXHAUST GAS CAN FLOW AND MOTOR VEHICLE HAVING AT LEAST ONE PARTICLE SEPARATOR

CROSS-REFERENCE TO RELATED APPLICATION

This application is a continuation, under 35 U.S.C. §120, of copending International application No. PCT/EP2011/070223, filed Nov. 16, 2011, which designated the United States; this application also claims the priority, under 35 U.S.C. §119, of German Patent Application DE 10 2010 051 730.5, filed Nov. 19, 2010; the prior applications are herewith incorporated by reference in their entirety.

BACKGROUND OF THE INVENTION

Field of the Invention

The present invention relates to a particle separator for the treatment of exhaust gases of an internal combustion engine, including at least one metallic layer through which exhaust gas can flow, in particular a screen layer. The invention can be used, in particular, for mobile internal combustion engines such as are provided for example in motor vehicles. The invention also relates to a motor vehicle having at least one particle separator.

The exhaust gas of an internal combustion engine generally contains pollutants and solids which, specifically taking into consideration the relevant regulations for the protection of health and the environment, must be removed. With regard to the solids, it has already been proposed to filter constituents of the fuel, such as for example soot or unburned hydrocarbons, sulfur compounds, etc., out of the exhaust gas and then (catalytically and/or thermally and/or chemically) eliminate or convert them. It is known for that purpose to use filters which have, for example, a porous wall, on or in which the solids are retained.

Aside from the solids generated from the burned fuel, the exhaust gas may have entrained in it additional particles which have a different origin and which are several times larger than the solids. Internal combustion engines and associated exhaust systems are often subject to intense vibrations during operation. That can cause particles, in particular in the form of chips, pieces of coatings and deposits and parts of exhaust-gas treatment units, to become detached and—entrained by the exhaust-gas flow—damage downstream components as a result of the momentum of the impact. Furthermore, the particles can lead to increased abrasion in moving components in the exhaust system, in particular a turbocharger or turbocompressor, as a result of the increased friction action in sealing gaps. Furthermore, exhaust systems are known which recirculate a part of the generated exhaust gas to the internal combustion engine again (AGR/EGR: exhaust-gas recirculation), in such a way that in that case, there is likewise the risk of the internal combustion engine being exposed to such particles and thus being damaged.

International Publication No. WO 2007/110170, corresponding to U.S. Pat. No. 8,082,729, proposes a configuration for the treatment of exhaust gases of an internal combustion engine, in which configuration a screen layer is used that is larger than a cross section of the exhaust line. The screen layer serves, in particular, for protecting a turbocharger, which is positioned downstream in the flow direction of the exhaust gas, against detached ceramic particles from a honeycomb body positioned upstream.

It has now been found that, with progressive operating duration, the retained particles can cause problems. It must be taken into consideration in that case that the particles are, for example, ceramic and/or metallic and are not converted in the exhaust system. Consequently, the particles accumulate in the exhaust system, for example in the vicinity of a particle separator, and/or impact repeatedly against the latter. Such an accumulation of particles may lead to a local and/or fluctuating pressure loss in the exhaust-gas flow, which may result in undesired (power-reducing) effects in the internal combustion engine and/or the exhaust system. Furthermore, in that case, the strain on the particle separator also increases, in such a way that the stability of the particle separator takes on an increased significance.

SUMMARY OF THE INVENTION

It is accordingly an object of the invention to provide a particle separator with a metal layer through which exhaust gas can flow and a motor vehicle having at least one particle separator, which overcome the hereinafore-mentioned disadvantages and at least partially solve the highlighted technical problems of the heretofore-known particle separators and motor vehicles of this general type. It is sought, in particular, to specify a particle separator for the treatment of exhaust gases, in which the particle separator, despite exhibiting a good accumulation rate for particles, permanently remains permeable to the exhaust gas with low pressure losses. It is also sought to improve the particle separator with regard to stability and (flexible and simple) production for series manufacture for automobile construction.

With the foregoing and other objects in view there is provided, in accordance with the invention, a particle separator for the treatment of exhaust gases of an internal combustion engine, comprising a housing with an inlet opening, an outlet opening, a cross section and a central axis, and at least one metallic layer through which an exhaust gas can flow. The at least one metallic layer is disposed in the housing and has at least one undulation or corrugation which spans the cross section of the housing.

In this case, a particle separator refers, in particular, to a device which retains, for example, (ceramic and/or metallic) chips, splinters, lumps, etc. that have become detached from a component of the exhaust system, for example due to vibration during operation and/or due to the pulsation of the exhaust-gas flow and/or due to aging. It is possible, in particular, for particles which have become detached from a ceramic or ceramically coated honeycomb body to be retained. It is also possible for less stable particles to be broken down, due to their momentum in interaction with the rigidity or inertia of the particle separator, into smaller particles which do not pose a hazard to further components disposed downstream.

The metallic layer through which the exhaust gas can flow is constructed specifically for the retention of the particles mentioned above. It is preferable in this case for only a (single) metallic layer to be used. The layer may, if appropriate, be formed with a plurality of plies (for example a first ply for screening out the particles and a second ply for fixing the first ply in the housing), wherein the plies are then preferably connected to one another by brazing, welding, sintering or the like. The metallic layer thus constitutes, in particular, a (single) areal structure which (completely) spans the cross section of the housing, in such a way that a flow past the metallic layer is not possible. In this case, the metallic layer is constructed to be so robust or dimensionally stable that it can permanently withstand the conditions (in particular the contact with the particles) at the location of use in the exhaust system.

The metallic layer may, for example, be in the form of a perforated metal sheet, in the form of a sheet-metal grid or the like. Furthermore, the metallic layer may (preferably) be in the form of a fabric which includes wires, filaments and/or chips in a regular and/or irregular configuration with respect to one another. Scrims and mats formed from wires, filaments and/or chips may also be used. The wires, filaments and/or chips may be connected to one another, for example by resistance welding, sintering and/or brazing. The metallic layer is, in particular, distinguished by its permeability to exhaust gases, wherein a very low pressure loss is generated. In this case, "metallic" means, in particular, an iron-containing and/or aluminum-containing metallic alloy.

The housing is generally a sheet-metal casing which is matched to the shape of the exhaust line. The housing may be formed from tubular material with various cross-sectional shapes: circular, oval, polygonal or other required shapes. In particular, a substantially cylindrical housing which can, for example, be inserted between the adjoining parts of the exhaust line and welded thereto may be used in this case.

The exhaust gas generally flows into the housing through the inlet opening, and the exhaust gas exits again through the outlet opening. The central axis of the housing generally runs through the geometric center of gravity of the inlet opening and of the outlet opening. It is possible in this case, if appropriate, for the central axis to also be curved if the housing has a bend. In the case of a cylindrical embodiment, for example, the central axis forms the central axis through the central point of the circular cross section. The cross section of the housing between the inlet opening and the outlet opening is oriented perpendicular to the central axis and may have varying area sizes and/or area shapes. It is, however, preferable for the size and shape of the cross section to be uniform along the central axis, that is to say the inlet opening, cross section and outlet opening are identical in this regard. With regard to the position of the at least one metallic layer in the housing, it is preferable for the metallic layer not to extend beyond the inlet opening or the outlet opening.

The metallic layer also has at least one undulation. It is preferable for the number of undulations (that is to say, in particular, of undulation peaks or undulation troughs) to be very low. It is very particularly preferable for at most five (5) undulations (that is to say undulation peaks and undulation troughs) to be provided. The undulation serves to create a considerably enlarged surface which can be impinged upon by the incoming exhaust gas. Maximum area utilization is thus attained in combination with a small structural extent of the particle separator and good flow characteristics. At the same time, the undulation can effect a diversion of the particles, in such a way that particles are accumulated in predetermined regions of the metallic layer. Since the undulation extends practically from one region of the housing to another region of the housing spaced apart therefrom, it is for example possible for centrally retained particles to be displaced outward toward the housing due to the exhaust-gas flow. The particles constitute a lesser flow resistance there. It is thus achieved, for example, that other regions of the particle separator always remain permeable (in relatively unimpeded form) to the exhaust gas. It is furthermore realized in this way that the particles are (repeatedly) moved transversely with respect to the flow direction of the exhaust gas in the undulation. The movement generated due to the changing flow conditions in the exhaust system has an abrasive effect on the particles, in such a way that they are repeatedly broken down and then, after reaching a non-critical size, can pass through the metallic layer. Specifically, this effect constitutes a considerable further development in relation to screens which have only a central depression where the particles are collected (and remain motionless) in the region of the main flow. In particular, in the particle separator according to the invention, displacement devices are provided which displace particles retained centrally (in the region of the main flow of the exhaust gas) toward the outside (into a region of the boundary flow of the exhaust gas). The exhaust gas itself can furthermore promote or even cause the displacement of the particles, in such a way that the displacement devices serve to (passively) guide the particles out of the center. It is preferable for the undulation of the metallic layer to form the displacement devices. In addition or alternatively, it is for example the case that the surface of the accumulation side of the metallic layer has a rough form so that the retained particles are broken down during a forced relative movement, for example from the inside toward the outside. It should also be noted that the undulation may also be fixed at both sides to the housing, and thus, overall, the position of the metallic layer and the orientation with respect to the flow direction of the exhaust gas can be set and maintained, in particularly stable fashion, even if the metallic layer itself has a filigree construction.

In accordance with another advantageous feature of the particle separator of the invention, a plurality of undulations span the cross section in the manner of secants. This means, in particular, that a plurality of rectilinearly running undulations are provided which extend to opposite regions of the housing. In this case, it is preferable for at least two (2) undulations to be provided which have a length smaller than the diameter of the cross section (in the manner of secants). The undulations, which are positioned at the edge of the housing, are of less relevance to the flow characteristic of the particle separator (slower boundary flow), so that it is also possible for smaller movement spaces for the particles to be provided in this case. At the same time, the undulations ensure particularly high stability of the metallic layer transversely with respect to the central axis, and thus make a particularly great contribution to dimensional stability and durability.

In accordance with a further advantageous feature of the particle separator of the invention, the at least one undulation runs in a plane perpendicular to the central axis. It is furthermore preferable for a plurality of undulations to end in a common cross-sectional plane of the housing, that is to say, in particular, for the undulation peaks and/or undulation troughs to be at substantially the same distance from the inlet opening or from the outlet opening of the housing. The distance of the undulations from one another in a radial direction (or in a direction transversely with respect to the central axis) may vary but is preferably approximately equal at least for some of the undulations. In this way, it is possible to attain a uniform impingement of flow on the metallic layer. Furthermore, the surrounding components such as the housing can be manufactured with low manufacturing outlay and, if appropriate, in high unit quantities of identical housing components.

In accordance with an added advantageous feature of the particle separator of the invention, the at least one undulation extends through a plane which is inclined with respect to the central axis. A further enlargement of the surface area of the metallic layer in relation to the cross section of the housing is attained in this way. Furthermore, by using a suitable configuration of the undulation, it is for example possible for a pre-separation of particles to be realized and/or for an accumulation zone to be formed in regions through which a weak flow passes, without the flow cross section being excessively constricted.

In accordance with an additional advantageous feature of the particle separator of the invention, the at least one undulation may have an undulation rise which is inclined by at least 45° with respect to the plane. It is proposed herein, in particular, that the undulation has an undulation rise or an undulation flank with an angle of at least 60° or even at least 80° with respect to the plane. By using a steep undulation rise, it is possible to achieve a flow of the exhaust gases without increased resistance through the undulation rises (undulation flanks), which are always free, after a relatively large amount of particles has accumulated perpendicular to the incoming flow. Furthermore, the back-pressure effect of the undulation peaks and undulation troughs can be reduced in an effective manner by using steep undulation rises.

In accordance with yet another advantageous feature of the particle separator of the invention, the at least one undulation has a maximum running transversely with respect to the housing and a minimum running transversely with respect to the housing, and a spacing of the maximum from the minimum corresponding at least to an average radius of the housing. Since (non-circular) lines for fluids are often converted, for the flow calculation, into circular pipes (for example into hydraulic diameter), an average radius is taken as a reference in this case. Since enlarged zones with slow flow arise in the case of polygonal cross sections, in fluid mechanics, the hydraulic radius is formed by dividing the area of the line by the (wetted) perimeter of the line of the respective cross section. In such a case, the average radius corresponds to the hydraulic radius. In the case of, for example, an oval rounding of the housing, the average radius refers to the arithmetic mean of the two superposed circles which form the maxima at 0° and 180° and at 90° and 270° respectively. With such a spacing between the maximum of the undulation (undulation peaks) and the minimum of the undulations (undulation troughs), a multiplication of the surface area, which is impinged upon by flow, of the particle separator, is attained. This consequently results in a multiplication of the surface area of the particle separator, which—considered on its own—does not lead to any further structural enlargement of the particle separator.

In accordance with yet a further advantageous feature of the particle separator of the invention, at least one metallic layer is disposed in an encircling gap of the housing. As already stated above, all of the components in an exhaust system are subjected to constant (external) vibrations and the exhaust-gas pulsation. At the same time, however, it is desirable for the metallic layer to be as thin-walled as possible, in such a way that the surface area which is active in terms of flow, that is to say which is impinged upon by the flow of exhaust gas and which thus forms the effective resistance, is kept small. Such filigree structures, fabrics and mat layers exhibit high flexibility and can only be deformed plastically into an undulating shape with difficulty. In order to nevertheless be able to easily (elastically) deform the metallic layer proposed herein and ensure that the shape remains stable in the installed state of the particle separator even under the action of vibrations and exhaust-gas pulsation, the metallic layer is held in its undulating form by an encircling gap in the housing. The metallic layer may be pushed into or laid in a gap of this type in undeformed state, or may be clamped by a gap between two housing halves which are mounted on one another. This does not rule out the possibility of the metallic layer also being cohesively connected to the housing, for example by welding, adhesive bonding or brazing. "Cohesive" refers to all connections in which the connecting partners (housing parts and/or metallic layer) are held together by atomic or molecular forces.

A nonwoven which has wire filaments sintered with one another may be used, for example, as a metallic layer. This can preferably be described by at least one of the following features:
- diameter of the wire filaments: between 20 and 50 μm [micrometers]; in particular constructed with two different (intermixed and/or interconnected) wire filaments (for example one 20 to 25 μm; the other 38 μm to 42 μm);
- mass per unit area of the nonwoven: between 350 g/mm$^2$ and 550 g/mm$^2$ [grams per square millimeter];
- air permeability of the nonwoven: between 2300 and 3500 l/m$^2$/s [liters per square meter and second].

Such a nonwoven may be used for retaining soot and/or other solids in the exhaust gas.

In accordance with yet an added advantageous feature of the particle separator of the invention, the at least one metallic layer includes openings having a width in a range of at least 0.05 mm [millimeters]. It is very particularly preferable for the metallic layer to have only openings which have at least an extent of 0.05 mm. In this case, the metallic layer preferably has a separation action (only) for particles which are larger than the openings. It is very particularly preferable for the openings to have, at a maximum, a width of up to 0.25 mm, in particular in a range of from 0.1 to 0.2 mm. It is the intention, in particular, for the particle separator to retain particles which can damage or block subsequent components (situated downstream) of the exhaust system. At the same time, however, the largest possible openings should be provided, which therefore pose the least possible flow resistance. A (priority) conversion of solids from the combustion of the fuel (gasoline, diesel, etc.) is not of primary concern in this case.

In accordance with yet an additional advantageous feature of the particle separator of the invention, the at least one metallic layer has a filter-free construction. This means, in particular, that the metallic layer does not function in the manner of a wall-flow filter and/or depth filter for the separation of soot or similar solids from the burned fuel. This should, if appropriate, likewise be understood to mean that the metallic layer does not have a catalytic coating by which the solids (soot, etc.) can be converted. Accordingly, the metallic layer serves practically only as a device for mechanical protection against large-mass, large volume and/or large-area particles which can block and/or damage components downstream. In particular, the metallic layer provides protection against sharp-edged splinters, in particular of ceramic honeycomb bodies and/or ceramic coatings. In this respect, the filter-free metallic layer has, in particular, purely the function of a screen, so that only particles several times larger than the solids (such as, in particular, soot) normally generated during the combustion of fuels used in the automotive field are retained.

With the objects of the invention in view, there is concomitantly provided a motor vehicle, comprising at least one internal combustion engine and an exhaust system. The exhaust system is formed with an exhaust-gas recirculation line, and at least one particle separator according to the invention is disposed in the exhaust-gas recirculation line.

Moving parts are provided in an internal combustion engine and in the exhaust system. In particular, the cylinder and piston of the internal combustion engine and the compressor blades of a turbocompressor are reliant on their effecting a good sealing action despite high thermal loading. Sharp-edged ceramic parts can specifically cause severe damage to turbocompressor blades and piston sealing rings. It is now proposed in this case, in particular, that the particle separator according to the invention be disposed downstream of a ceramic honeycomb body and/or a ceramically coated honeycomb body, in particular in (that is to say including "directly at") the exhaust-gas recirculation line upstream of a turbocompressor. Due to the particle separator, the adverse effect of the increase in flow resistance is practically permanently negligible. Furthermore, the particle separator can, due to its adaptable structural extent and flexibility, be used in a very flexible manner, in particular in regions of the exhaust line which have heretofore remained unutilized for structural reasons.

Other features which are considered as characteristic for the invention are set forth in the appended claims, noting that the features specified individually in the dependent claims may be combined with one another in any desired technologically expedient manner and form further embodiments of the invention.

Although the invention is illustrated and described herein as embodied in a particle separator with a metal layer through which exhaust gas can flow and a motor vehicle having at least one particle separator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
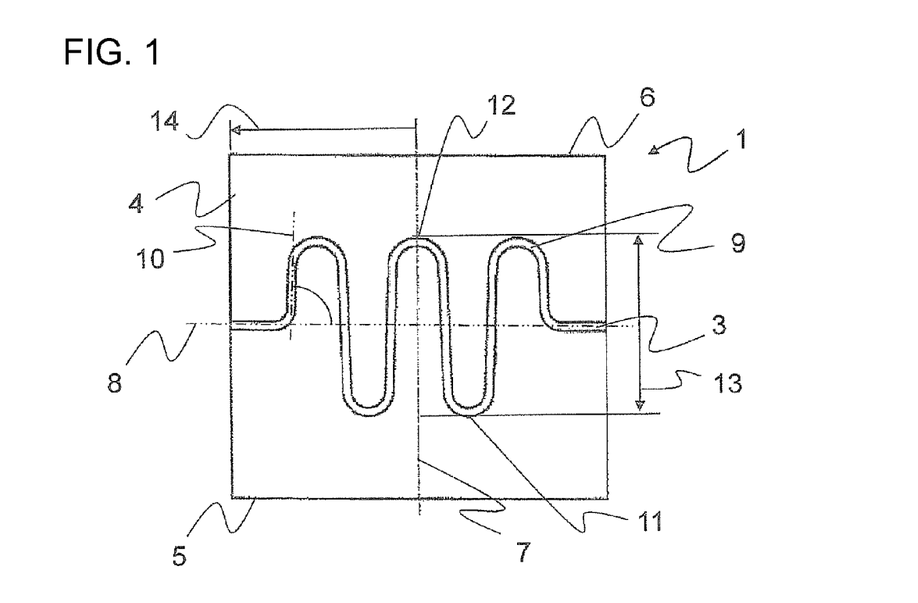
FIG. 1 is a diagrammatic, side-elevational view of a particle separator with multiple undulations in a perpendicular plane.

Referring now to the figures of the drawings in detail and first, particularly, to FIG. 1 thereof, there is seen a particle separator 1 in a side view, in which a metallic layer 3 is illustrated by an undulating line in the center of a housing 4. In this case, an inlet opening 5 is disposed at the bottom of the housing 4 and an outlet opening 6 is disposed at the top of the housing 4 if a throughflow is to take place from bottom to top. This designation may consequently be simply reversed in the case of an opposite throughflow. In this case, a central axis 7 of the housing 4 likewise forms an axis of symmetry for the illustrated particle separator 1. A plane 8, which extends transversely (in this case perpendicularly) with respect to the central axis 7, is indicated centrally through the housing 4 in the illustrated example and extends through left-hand and right-hand edges of the metallic layer 3. An undulation 9 illustrated therein has three minima 12 (that is to say undulation troughs as viewed in the flow direction of the exhaust gas) and two maxima 11 (that is to say undulation peaks as viewed in the flow direction of the exhaust gas). An undulation rise 10 (or undulation flank) of each of the undulations 9 is inclined by approximately 90° with respect to the plane 8. As flow impinges, the particles can be accumulated in the minima 12 and the major part of the metallic layer in the form of the undulation rises 10 nevertheless remains free for the throughflow. It can also be seen in this illustration that a spacing 13 between the maximum 11 and the minimum 12 as viewed in the direction of the central axis 7 is slightly larger than an average radius 14 of the illustrated particle separator 1 or housing 4.

Figure 2:
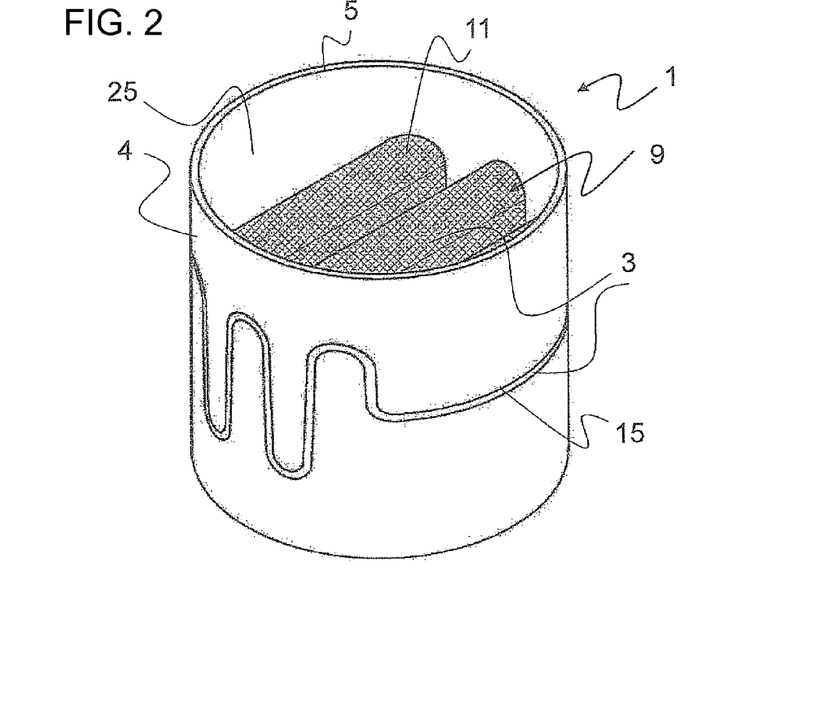
FIG. 2 is a perspective view of a particle separator with multiple undulations and a gap in a housing.

FIG. 2 shows a three-dimensional illustration of a particle separator 1 similar to the variant of FIG. 1. The illustrated housing 4 exhibits a uniform circular cross section 25 over the entire axial extent. The metallic layer 3 is held in an encircling gap 15 in the housing 4. The gap 15 may be produced in different ways, for example by a groove milled-in on the inner side of the housing 4 or by two (previously separate) housing halves which are joined together, with the metallic layer 3 situated in between, to form the housing 4. Due to the undulation of the metallic layer 3, the gap 15 or the joining connection of the housing and the metallic layer does not have a "rectilinear" profile but rather a profile extending or running on a path over the circumference, which (repeatedly) approaches firstly the inlet opening and secondly the outlet opening (in a partially meandering profile). This stable connection has a considerable influence on the stability of the particle separator 1.

Figure 3:
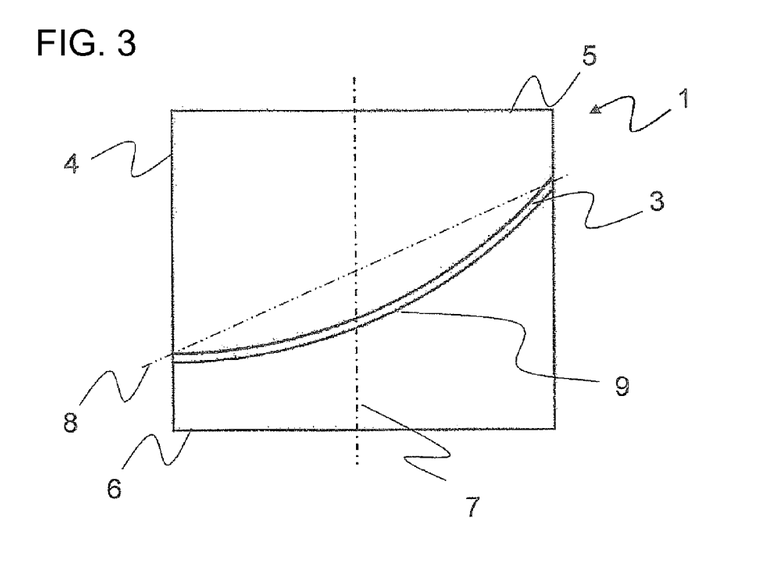
FIG. 3 is a side-elevational view of a particle separator with a single undulation along an inclined plane.

FIG. 3 shows a particle separator 1 in which the metallic layer 3 has only one undulation 9 along a plane 8 which is oblique or inclined with respect to the central axis 7. In the illustration, the inlet opening 5 is at the top and the outlet opening 6 is at the bottom, although the reverse configuration may also be considered. As a result of the undulation 9, the particle separator may possibly become blocked by accumulating particles only in the left-hand region of the illustration. The remaining surface of the particle separator 1 remains free for the throughflow.

Figure 4:
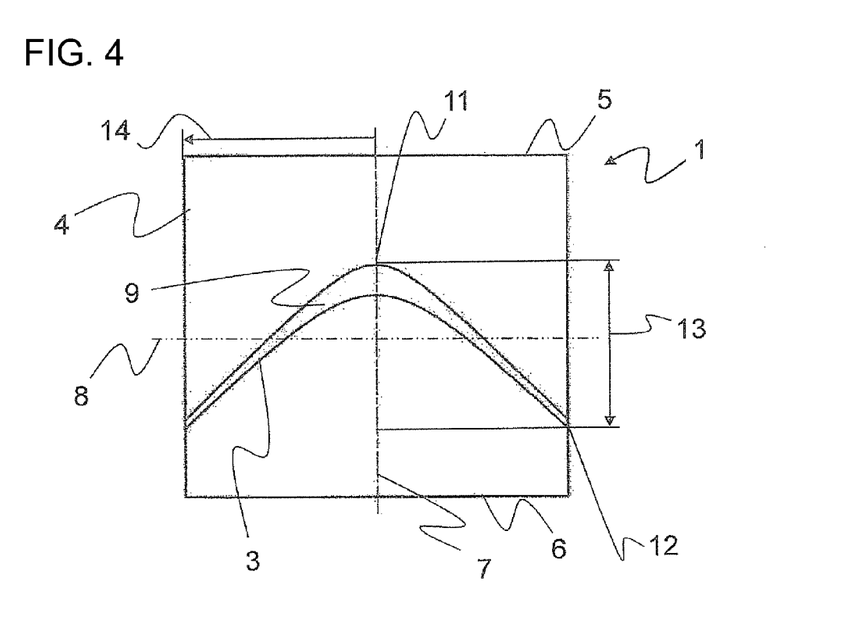
FIG. 4 is a side-elevational view of a particle separator with a single undulation along a perpendicular plane.

FIG. 4 shows a particle separator 1 in which the metallic layer 3 likewise has a (single) undulation 9, but the undulation is oriented along a plane 8 perpendicular to the central axis 7 of the housing 4. The direction of the flow impinging on the illustrated particle separator 1 is indicated by the inlet opening 5 and leads from top to bottom along the central axis 7 and emerges again through the outlet opening 6. In this case, any particles in the exhaust-gas flow collect at the outer sides. If the particle separator 1 is circular, for example, the deposition locations for any particles are considerably smaller than the surface area that remains free. This can also be achieved by other cross sections of the housing 4. Furthermore, the spacing 13 between the maximum 11 and the minimum 12 of the undulations is larger than the average radius 14 of the housing 4, so that a doubling of the surface area that can be impinged upon by a flow is attained in relation to the cross section 25 of the particle separator 1.

Figure 5:
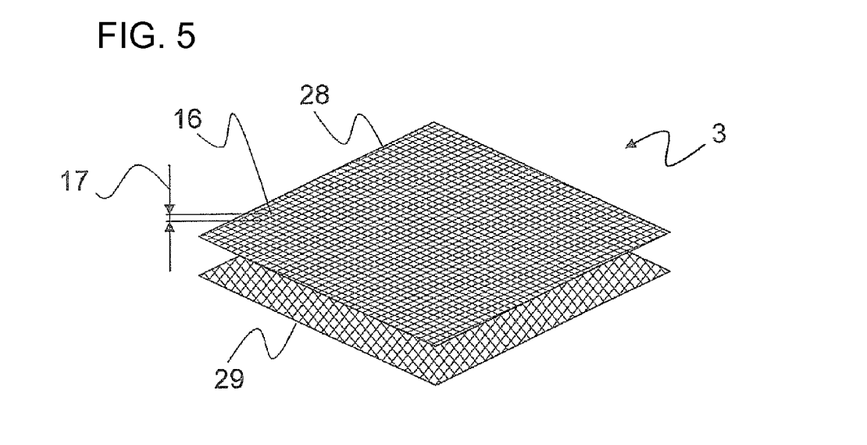
FIG. 5 is an exploded perspective view of a two-ply metallic layer.

FIG. 5 shows a multi-ply version of a metallic layer 3, in which a first ply 28 and a second ply 29 are disposed in direct areal contact with one another (shown therein partially as an exploded illustration). The first ply 28 that is impinged upon by a flow has a width 17 of openings 16 which is several times smaller than a width 17 of openings 16 in the subsequent second ply 29. Therefore, (only) the first ply performs the function of particle separation, whereas the second ply 29 serves (merely) as a (rear-side) support or partial abutment for the first ply 28. In any case, the metallic layer 3 (or in this case the first ply 28) has openings 16 with a width 17 which lies in a range of from 0.05 to 0.25 mm.

Figure 6:
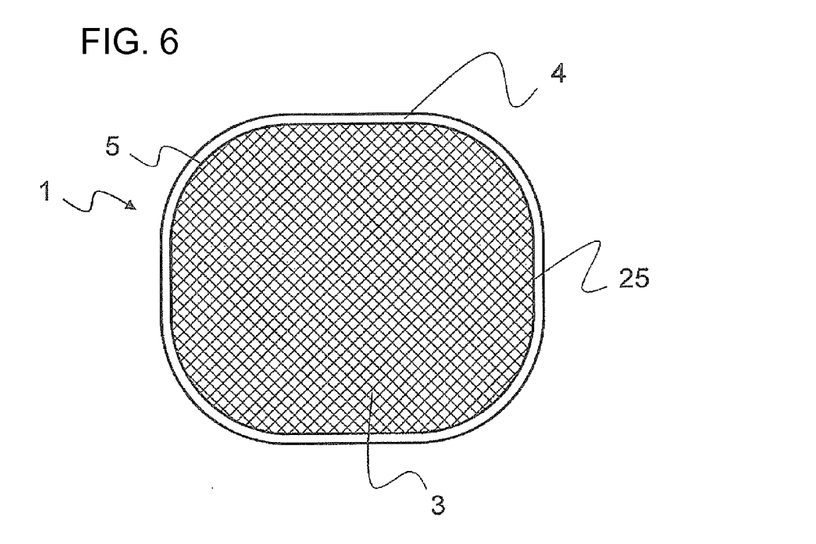
FIG. 6 is a plan view of a particle separator with a non-circular cross section.

FIG. 6 shows a particle separator 1 in a plan view, in which the metallic layer 3 is, for simplicity, shown with a structure which visually does not correspond to the undulation. FIG. 6 shows merely one of many possibilities for the configuration of the cross section 25 of the housing 4 or of the inlet opening 5. It is likewise possible for the inlet opening and the outlet opening 6 to have shapes which differ from one another and/or from some other cross section 25 of the housing 4.

Figure 7:
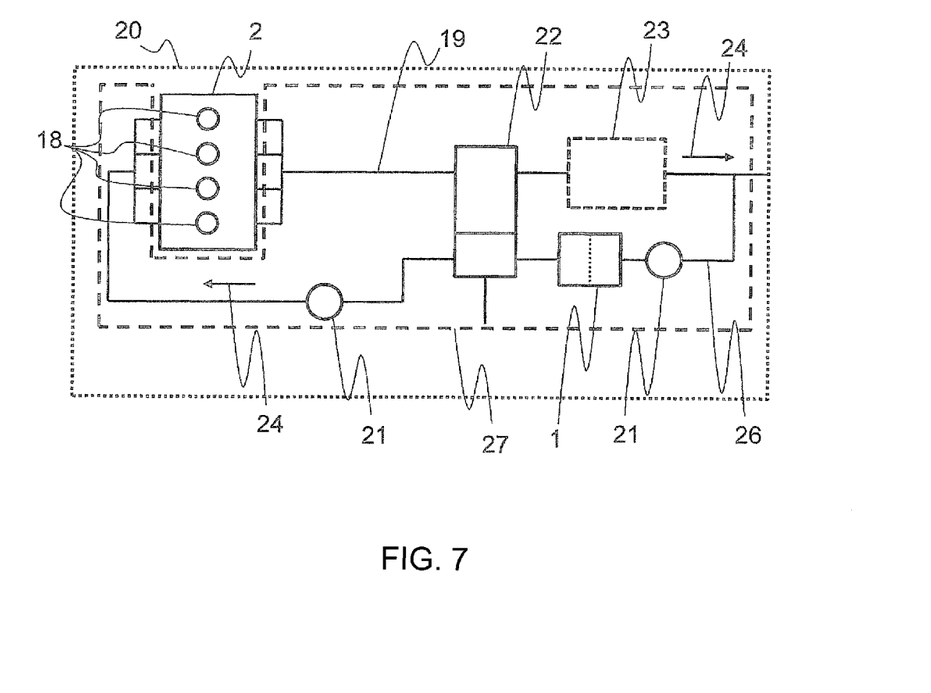
FIG. 7 is a block diagram of a motor vehicle having an internal combustion engine and an exhaust system with an exhaust-gas recirculation line.

FIG. 7 shows a motor vehicle 20 which has an internal combustion engine 2, a particle separator 1, a turbocharger 22 and optionally an exhaust-gas purification unit 23. An exhaust system 27 is composed of an exhaust-gas line 19 and an exhaust-gas recirculation line 26. A displacement 18 of the internal combustion engine 2 is supplied, on the left-hand side in the illustration, with supercharged exhaust gas, and on the other side exhaust gas flows out again in a flow direction 24. Due to the use of the particle separator 1 in the exhaust-gas recirculation line 26, a turbocompressor of the turbocharger 22 is protected against any relatively large particles in the exhaust system 27. The particles may originate, for example, from a (partially) ceramic exhaust-gas purification unit 23 through which the exhaust gas has flowed through previously. The particle separator 1 thus protects all subsequent components (disposed downstream) against relatively large particles from the internal combustion engine 2, and the portions of the exhaust-gas line 19 situated upstream of the particle separator 1. Such components are, in particular, the turbocharger 22 and/or other exhaust-gas purification units and/or coolers 21 (or heat exchangers), in particular in the exhaust-gas recirculation line 26. The internal combustion engine 2 and the displacements 18 thereof are thus also protected against damage by relatively large particles. FIG. 7 shows an arbitrary technically expedient configuration of the particle separator 1 and does not constitute any limitation with regard to the exact configuration of the particle separator 1.

The invention thus at least partially solves the technical problems highlighted in conjunction with the prior art. In particular, particle separators have been proposed which, despite having a small structural extent, have a large surface area for the lowest possible flow resistance and a low tendency to become blocked during the course of continuous operation.

The invention claimed is:

1. A particle separator for the treatment of exhaust gases of an internal combustion engine, the particle separator comprising:
  a housing having an inlet opening, an outlet opening, a cross section, regions being at least mutually spaced apart or opposite one another, and a central axis; and
  at least one metallic layer through which an exhaust gas can flow, said at least one metallic layer disposed in said housing;
  said at least one metallic layer having an undulation with peaks and troughs spanning said cross section of said housing, said undulation extending rectilinearly from one of said regions of said housing to another of said regions of said housing being at least mutually spaced apart or opposite one another; said undulation having a maximum running transversely relative to said housing and a minimum running transversely relative to said housing; and said maximum and said minimum being spaced apart in the axial direction by a spacing corresponding at least to an average radius of said housing; and said at least one metallic layer having openings with a width in a range of from 0.1 to 0.2 mm.

2. The particle separator according to claim 1, wherein said peaks and troughs of said undulation span said cross section as secants.

3. The particle separator according to claim 1, wherein said undulation runs in a plane perpendicular to said central axis.

4. The particle separator according to claim 1, wherein said undulation extends through a plane inclined relative to said central axis.

5. The particle separator according to claim 3, wherein said undulation has an undulation rise inclined relative to said plane by at least 45°.

6. The particle separator according to claim 4, wherein said undulation has an undulation rise inclined relative to said plane by at least 45°.

7. The particle separator according to claim 1, wherein said at least one metallic layer is disposed in an encircling gap in said housing.

8. The particle separator according to claim 1, wherein said at least one metallic layer is a screen layer with a filter-free construction.

9. A motor vehicle, comprising:
  at least one internal combustion engine;
  an exhaust system associated with said at least one internal combustion engine and having an exhaust-gas recirculation line; and
  at least one particle separator according to claim 1 disposed in said exhaust-gas recirculation line.

10. The particle separator according to claim 1, wherein said at least one metallic layer is a screen layer.

11. The particle separator according to claim 1, wherein said at least one metallic layer is a single metallic layer.

12. The particle separator according to claim 1, wherein said at least one metallic layer is formed with a plurality of plies including:
  a first ply for screening out the particles, and
  a second ply for fixing said first ply in said housing.

13. The particle separator according to claim 1, wherein said undulation of said metallic layer forms displacement devices, and said displacement devices outwardly displace centrally retained particles.

14. The particle separator according to claim 1, wherein said metallic layer has an accumulation side with a surface having a rough form breaking down retained particles during a forced relative movement.

15. A particle separator for the treatment of exhaust gases of an internal combustion engine, the particle separator comprising:
  a housing having an inlet opening, an outlet opening, a cross section, regions being mutually spaced apart, and a central axis; and
  at least one metallic layer through which an exhaust gas can flow, said at least one metallic layer disposed in said housing and having an undulation with peaks and troughs spanning said cross section of said housing;
  said undulation extending rectilinearly from one of said regions of said housing to another of said regions of said housing being mutually spaced apart, causing centrally retained particles to be displaced outward toward said housing due to an exhaust-gas flow; said undulation having a maximum running transversely relative to said housing and a minimum running transversely relative to said housing; and said maximum and said minimum being spaced apart in the axial direction by a spacing corresponding at least to an average radius of said housing.

16. The particle separator according to claim 15, wherein said at least one metallic layer is a screen layer or a single metallic layer.

17. The particle separator according to claim 15, wherein said at least one metallic layer is formed with a plurality of plies including:
    a first ply for screening out the particles, and
    a second ply for fixing said first ply in said housing.

18. The particle separator according to claim 15, wherein said undulation of said metallic layer forms displacement devices, and said displacement devices outwardly displace centrally retained particles.

19. The particle separator according to claim 15, wherein said metallic layer has an accumulation side with a surface having a rough form breaking down retained particles during a forced relative movement.

20. The particle separator according to claim 15, wherein said peaks and troughs span said cross section as secants.

21. The particle separator according to claim 15, wherein said undulation runs in a plane perpendicular to said central axis.

22. The particle separator according to claim 15, wherein said undulation extends through a plane inclined relative to said central axis.

23. The particle separator according to claim 15, wherein said at least one metallic layer is disposed in an encircling gap in said housing.

24. The particle separator according to claim 15, wherein said at least one metallic layer is a screen layer with a filter-free construction.

25. A motor vehicle, comprising:
    at least one internal combustion engine;
    an exhaust system associated with said at least one internal combustion engine and having an exhaust-gas recirculation line; and
    at least one particle separator according to claim 15 disposed in said exhaust-gas recirculation line.

\* \* \* \* \*